May 9, 1961 W. M. TEMPLIN 2,983,277
ALTITUDE CONTROL DEVICE FOR AUTOMATIC PILOTS
Filed Dec. 30, 1958 2 Sheets-Sheet 1

INVENTOR.
WALTER M. TEMPLIN

BY *John C. McGregor*
*James C. Eisenman*

ATTORNEYS

United States Patent Office 2,983,277
Patented May 9, 1961

2,983,277
ALTITUDE CONTROL DEVICE FOR AUTOMATIC PILOTS

Walter M. Templin, Wayne, Pa., assignor to Aircraft Products Co., Bridgeport, Pa., a corporation of Pennsylvania Filed Dec. 30, 1958, Ser. No. 783,928
11 Claims. (Cl. 137—81)

This invention relates to automatic pilots for airplanes, and, more particularly, to automatic pilot apparatus capable of maintaining the aircraft at a constant altitude in flight.

Automatic pilots for aircraft include as their basic apparatus means to maintain the aircraft on a predetermined course under stable flight conditions. Further refinements in automatic pilots enable the aircraft to be flown by means of command control signals introduced into the automatic pilot system, the automatic pilot in this case serving the function of a power steering mechanism by means of which the plane can be flown by fingertip manipulation. Still further instrumentation can be used with automatic pilots to enable the aircraft to be flown at a constant altitude. Normally, altitude controlling or holding devices operate by sensing pressure changes which derive from the normal pressure gradient of the atmosphere. The problem of sensing pressure changes is complicated, however, by the fact that temperature changes are frequently encountered either in the atmosphere or within the aircraft to introduce erroneous altitude information into the system by effecting pressure changes. Also, certain transient pressure effects such as ram pressure in the cabin of an airplane arising from the opening, for example, of a ventilator can cause the altitude control system to sense a pressure change which bears no relationship to the altitude of the aircraft.

Accordingly, it is one object of the present invention to provide new and improved apparatus for use with automatic pilots for maintaining aircraft in flight at a constant altitude.

Another object of the invention is to provide altitude control apparatus for use with automatic pilots for aircraft which is substantially insensitive to random temperature changes.

In accordance with the present invention, there is provided apparatus for use with basic automatic pilot systems whereby the aircraft can be flown automatically at a constant altitude. To this end, there is provided a system of interacting transducers responsive to pressure and temperature and whose signals are combined to afford a compensated output which is in turn converted to a differential valve action in the pneumatic input section of an automatic pilot. The pressure sensing portion of the apparatus can take the form of a bellows having a predetermined spring rate and partially filled with a gas. Exteriorly the bellows is contained within a closed chamber which is placed in communication with the atmosphere by means of a static line. The motion of the bellows is transmitted to the exterior of the casing through a highly flexible diaphragm system which is capable of moving with the bellows and which causes a flapper valve to move between a pair of balanced pneumatic orifices to introduce a pressure differential signal into the pneumatic conduits leading to the two nozzles. Also contained within the casing of the instrument is a second pneumatic signal indicator generator which responds inversely to temperature by furnishing a positive pneumatic signal when the temperature drop, i.e., enlarging and diminishing the volume of the pressure-sensing bellows, these signals being introduced directly into the pressure-sensitive bellows to afford a direct compensation for temperature change in any direction. To operate the altitude control mechanism from a remote point, a pneumatic bypass system is connected across the pressure-sensitive bellows to afford a shunt path when it is desired to disable or inactivate the instrument.

The above and other features and objects of the present invention will be readily understood having reference to the following specification of a preferred embodiment thereof taken in conjunction with the accompanying drawings, in which.

Figure 1:
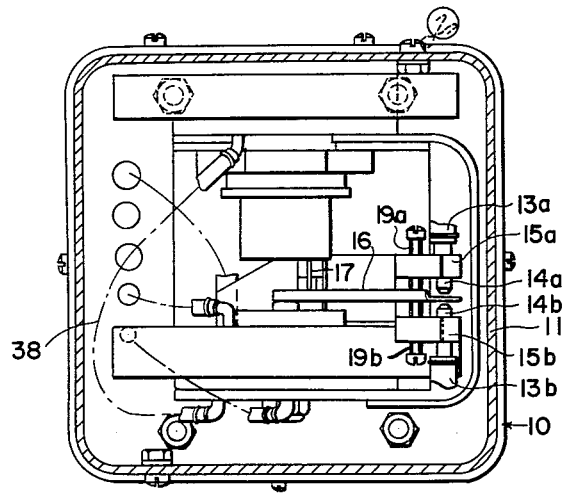
Figure 1 is a view in side elevation with its casing cut away in vertical section of an altitude hold mechanism for use with an automatic pilot.

Referring first to Figure 1 the invention is illustrated as embodied in an instrument identified generally by the numeral 10 for furnishing output signals which represent a pressure change which signifies a change in altitude up or down of an aircraft. Such instruments are generally known as altitude control or altitude hold devices, and their output signals are coupled into the automatic pilots of the aircraft to be amplified and utilized to operate the elevator control surfaces. The illustrated instrument 10 is designed to furnish pneumatic output signals adapted to be fed into a pneumatically controlled automatic pilot such, for example, as that disclosed in the pending application entitled "Automatic Pilot," Serial No. 728,158, filed April 14, 1958.

Figure 2:
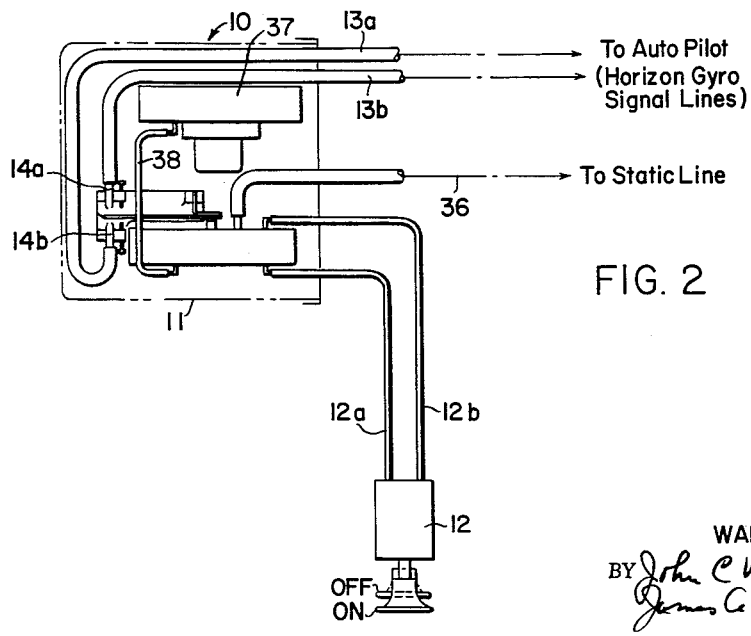
Figure 2 is a diagrammatic view showing external pneumatic conduits for carrying the output signals of and for controlling from a remote point the altitude hold device.

The instrument 10, which is received within a closed casing 11, can be mounted at any convenient location in the aircraft, usually within the cabin and is engaged and disengaged from the automatic pilot by means of a control assembly 12 (Figures 2 and 4) which can take the form of a pneumatic shutoff valve coupled to the instrument by means of conduits 12a and 12b. The control assembly 12 is small in size and can be conveniently located near the pilot, preferably adjacent the command control unit for the automatic pilot to which the instrument feeds its signals. The output signals of the instrument 10 are connected to the signal lines of the automatic pilot by means of a pair of pneumatic conduits 13a and 13b. In accordance with well known principles of pneumatic control used in automatic pilots, the conduits 13a and 13b convey signals by means of pressure differentials thereacross based on controlled pneumatic flow generated by a pressure source differing from atmospheric pressure. Usually a partial vacuum is used to establish the basic flow which is modulated by the instrument to convey information.

Figure 3:
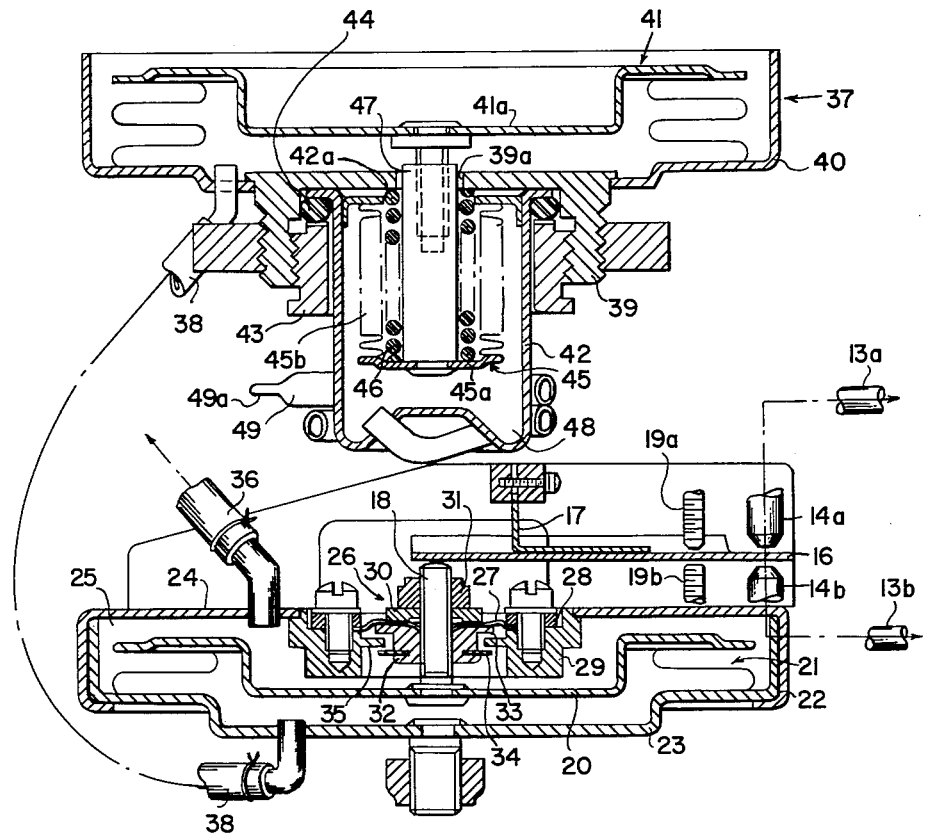
Figure 3 is a view in enlarged scale and in vertical section of the internal mechanism of the altitude hold device of Figure 1.

Within the casing 11, the conduits 13a and 13b terminate in orifices or nozzles 14a and 14b secured respectively in fixed supporting blocks 15a and 15b in opposed relation to one another along a common axis. Disposed between the two nozzles 14a and 14b is a flapper or valve member 16 which pivots on a flexible supporting tongue 17 (best seen in Figure 3) and taking the form of a thin metal strip secured as by soldering or welding to the flapper 16. The inner end of the flapper 16 engages on its under side an actuating member or post 18 which moves axially upward or downward as a function of pressure or altitude change. The pivotal movement or travel of the working end of the flapper 16 is limited by a pair of adjustable stops 19a and 19b threaded into the supporting blocks 15a and 15b respectively. Also, if it is desired to correct for position sensitivity due to gravity forces acting, for instance, on the bellows 21, the flapper can be counterweighted.

The actuating member or post 18 is driven by the movable portion 20 of a pressure deformable member or bellows 21. The pressure deformable member 21 is integrated with a closed, air-tight container 22, the lower wall 23 of which seals off the pressure deformable member 21. The upper surface 24 of the container 22 defines a closed working space 25 within which the movable portion 20 operates. Mounted within a central aperture in the upper surface 24 of the container 22 is a low impedance diaphragm assembly indicated generally by the numeral 26 which seals the space 25 from the effects of external pressure changes but which at the same time affords limited axial travel for the actuating member 18. The diaphragm assembly 26 includes a diaphragm 27 formed preferably of a highly flexible imperforate material such, for example, as rubberized fabric.

The diaphragm 27 is clamped at its outer preiphery between a clamping ring 28 and a fixed annulus air tightly secured to the upper surface 24 of the casing 22. The diaphragm 27 is secured at its inner edges to the actuating member or post 18, being clamped between a clamping washer 30 and a pair of clamping nuts 31 and 32 threaded and locked on the threaded post 18. The clamping nut 32 carries a pair of axially spaced annular flanges 33 and 34 which embrace a radially inwardly extending flange 35 carried by the annulus 29. In this fashion the axial travel of the actuating post 18 is limited and in addition, air sealing surfaces are established to supplement the diaphragm 27 when extreme pressure differentials occur, thereby protecting the diaphragm against possible blowout.

The space 25 which represents the exterior of the pressure deformable member 21 is connected by a conduit 36 to a static pressure source located exteriorly of the cabin of the aircraft. Also the conduits 12a and 12b of the control assembly 12 are connected respectively to the closed space 25 on the outside of the pressure deformable member 21 and to the closed space inside the member 21 to form a shunt circuit across the member when the control assembly 12 is approximately set. Lastly, the space inside the pressure deformable member 21 is connected to a pneumatic signal source indicated generally by the numeral 37 via a pneumatic conduit 38.

The pneumatic signal source 37, which is also mounted within the casing 11, includes a frame portion 39 carrying a cup-shaped member 40 within which is mounted a pneumatic signal-generating unit 41 taking the form of a bellows. The frame 39 also supports a sealed cylindrical container 42 mounted coaxially with respect to the bellows 41 and secured in place by a ring nut 43 working against a sealing ring 44. Mounted within the closed chamber 42 is a pressure deformable assembly 45, also taking the form of a bellows and carried by the base or innermost end of the chamber 42. The deformable assembly 45 is positioned by an internal coil spring 46.

The movable portion 45a of the assembly 45 has secured thereto a post 47 secured at its opposite end to the pneumatic signal-generating unit 40 or, more particularly, to the movable portion 41a thereof. The post 47 passes through aligned apertures 39a and 42a in the frame 39 and cylindrical container 42, and the closed space 48 within the container 42 is sealed from the apertures 39a and 42a by a flexible corrugated wall 45b of the assembly 45. The closed space 48, which is filled with a liquid preferably having a substantially linear coefficient of expansion such, for example, as ethyl alcohol, has connected thereto an elongated calibrating tube 49. The tube 49 which, for convenience, is coiled about the cylindrical chamber 42, is pinched off at its free end 49a at a predetermined length so that the volume of liquid captured within the system is precisely regulated. The conduit 38 which connects at one end to the inside of the pressure deformable member or bellows 21 is connected at its other end to the inside of the pressure generating member or bellows 41.

Figure 4:
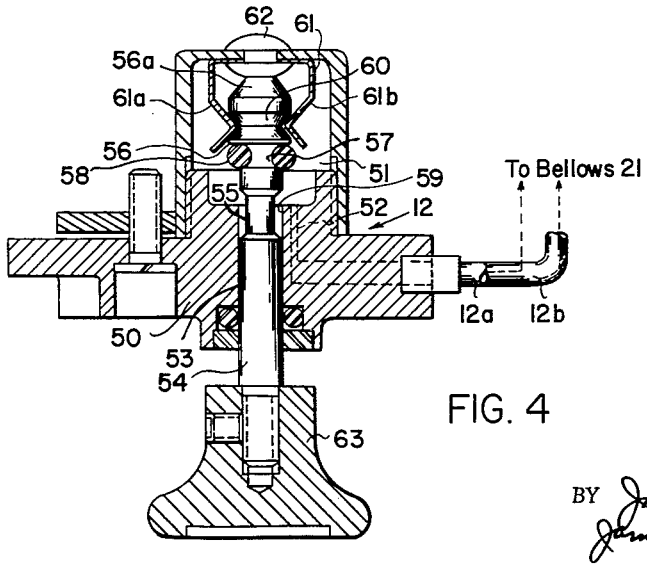
Figure 4 is a view in enlarged scale showing a remote control valve for cutting the altitude hold device into and out of an automatic pilot system.

The control assembly 12, as best seen in Figure 4, which is connected across the pressure deformable member 21 by means of the conduits 12a and 12b, constitutes a selector valve by means of which a shunt path can be provided across the working surfaces of the deformable member thereby rendering it inoperative, i.e., unresponsive to pressure changes. When the valve is closed, thereby isolating the conduit 12a from the conduit 12b, the bellows is conditioned for operation. To this end, the control assembly 12 includes a valve body 50 adapted to be mounted at a conveniently accessible point, preferably, adjacent the command control unit of the automatic pilot (not shown). The valve body 50 includes a valve chamber 51 to which the conduit 12a is connected. The conduit 12a communicates with the chamber 51 through a conduit 52, and the conduit 12b communicates with an axial bore 53 through a radial duct (not shown). The movable portion of the valve includes a valve stem 54 slidably received within the bore 53 and having a portion 55 of reduced diameter. The inner end of the valve stem 54 carries a head portion 56 formed with a groove 57 to receive a valve ring 58 adapted to engage a valve seat 59 formed in the valve body 50 when the valve is closed. The head portion 56 is also formed with a detent groove 60 which receives spring detent fingers 61a and 61b of a detent member 61 secured by a rivet 62 to the upper end of the valve body 50. The upper end 56a of the head portion 56 is tapered so that the spring fingers 61a and 61b, which bear against the tapered parts when the valve is closed, will impart an axial force on the valve stem to hold the valve on its seat. A control knob 63 is attached to the outer end of the valve stem 54 for convenient operation.

In the position illustrated, the valve is open to place the conduit 12a in communication with the conduit 12b to establish a shunt or bypass circuit around the pressure-responsive member 21. In this position, the altitude control instrument is disabled, and no pneumatic signals appear in the signal conduits 13a and 13b. By pulling the knob 63 outwardly, seating the valve ring 58 on the seat 59, the instrument is conditioned for operation, and signals will appear in the signal conduits 13a, 13b in response to atmospheric pressure change.

The operation of the instrument derives from atmospheric pressures introduced through the static line conduit 36 into the space 25 surrounding the pressure deformable member 21 causing the movable portion 20 of the deformable member to move upward or downward with a corresponding change in static line pressure. The static line normally derives its pressure from an isolated point which is free of artificially induced pressure changes, air turbulence or the like. The pressure change in the static line is, therefore, indicative of an altitude change, and a correcting signal is introduced into the automatic pilot by means of the differential pressure in the conduits 13a and 13b arising from movement of the flapper 16 between the nozzles 14a, 14b, away from one and toward the other. This signal will cause the control surfaces of the aircraft to be operated by the automatic pilot to steer the aircraft upward or downward, as the case may be, to attain the altitude at which the altitude control instrument was conditioned for operation, i.e., maintain a constant altitude. The instrument is insensitive to localized pressure changes which might occur in the vicinity of the instrument such, for example, as ram pressure effects arising from operation of a cabin ventilator due to the action of the diaphragm 27 to shield the pressure-deformable member 21 from random pressure changes while at the same time affording relative freedom of movement of the actuating member or post 18 to drive the flapper 16.

The instrument is also insensitive to temperature changes in the vicinity of the pressure-deformable member 21 which would normally cause the gas therein to expand or contract to establish a spurious output motion indistinguishable from that which occurs in response to true altitude change. Temperature change around the instrument is nullified by the action of the pneumatic signal source 37 which supplies gas to or extracts gas from the pressure-deformable member 21 inversely with changes of temperature. This is accomplished by expansion or contraction of the liquid in the closed chamber 48 driving the movable member 41 upward or downward to establish pneumatic flow in the coupling conduit 38 leading to the deformable member 22 to compensate for the expansion or contraction of the gas therein.

While the invention has been described above having reference to a preferred embodiment thereof, it will be understood that the instrument can take various forms and arrangements within the scope of the present invention, which should not, therefore, be regarded as limited except as defined by the following claims.

I claim:
1. Altitude control apparatus for automatic pilots for affording an output signal representing a change in altitude comprising a first sealed, pressure-deformable member containing a gas, a closed housing for the member, means to communicate atmospheric pressure to the closed housing outside of the member, means including a second sealed, deformable member containing a gas, temperature responsive means coupled to the second member to expand the same with increasing temperature and contract the same with decreasing temperature, conduit means to connect the first and second members, and an output means coupled to the movable portion of the first member to move as a function of altitude change.

2. Apparatus as set forth in claim 1, said means responsive to output motion comprising a flapper element supported for pivotal movement, means to couple the flapper element to the output means, and a pair of pneumatic orifices disposed on aligned axes and on opposite sides of said flapper, whereby flapper motion opens one orifice and closes the other.

3. Apparatus as set forth in claim 2, said support for the flapper comprising a flexible, resilient member defining a pivot axis disposed between the orifices and the point of connection with the output means and biasing the flapper against the output means.

4. Apparatus as set forth in claim 1, said temperature responsive means including a closed container for a liquid, pressure responsive means adapted to be moved in response to expansion and contraction of the liquid, mechanical coupling means to couple said pressure responsive means to said second member, said container having an aperture to accommodate the coupling means, and flexible sealing means connected between the container for said member and the mechanical coupling means to seal the aperture to isolate the liquid from the second member.

5. Apparatus as set forth in claim 4 including a frame to support the second deformable member, and spring means reacting between the frame and said pressure responsive means to position the pressure responsive means and to position the second deformable member against movement in response to expansion and contraction of the gas therein.

6. Apparatus as set forth in claim 1 including a valve member, said output means including a post passing through an aperture in the closed housing to couple the movable portion of the pressure deformable member to the valve member, a flexible diaphragm sealing the aperture in the housing and secured to the post to afford limited movement thereof, and complementary limit stop means carried by said post and casing, respectively, to limit the motion thereof.

7. Apparatus as set forth in claim 6, said limit stop means including overlapping flanges carried respectively by the post and the housing and adapted to afford a secondary air seal when engaged.

8. Altitude control apparatus for automatic pilots comprising a pressure deformable assembly having a sealed space therein and deformable in response to change in atmospheric pressure, a closed casing for the pressure deformable assembly, an output member connected to the movable portion of the deformable assembly and passing through an opening in the wall of the casing, and a flexible, imperforate diaphragm connecting the wall of the casing adjacent said aperture to the movable output member and sealing the aperture against passage of air therethrough, and conduit means to connect the atmosphere to the space within the closed casing exteriorly of the pressure deformable member, a pair of axially spaced apart radially extending flanges carried by the movable member and a radially inwardly extending flange carried by the casing extending into the space between the two flanges carried by the movable member to afford secondary air seals when respectively engaged thereby.

9. Apparatus as set forth in claim 8, said flexible diaphragm overriding one of the flanges on said movable member, and clamping means to hold the diaphragm against the flange in sealing relationship.

10. Altitude control apparatus for automatic pilots comprising a closed casing, a sealed bellows mounted in said casing, means to communicate atmospheric pressure to the space within the casing exteriorly of the bellows whereby the bellows expands and contracts in response to atmospheric pressure changes, an aperture in the wall of the casing opposite the movable portion of the bellows, a threaded post secured to the movable portion of the bellows and extending through the aperture, a first nut means threaded onto the post and having a pair of radially extending flanges spaced apart along the axis of the post, a fixed radially inwardly extending flange carried by the casing and extending into the space between the flanges carried by the post, a flexible diaphragm in sealing relationship with the casing adjacent the aperture having a central aperture through which the post passes, and second nut means threaded onto the post to clamp the inner portion of the flexible diaphragm against the first nut means in sealing relationship, whereby the post is free to move axially with movement of the bellows and the aperture through which the post projects is sealed against the passage of gas.

11. Apparatus as set forth in claim 10, including valve means engaged by said post to be actuated thereby, said valve means including a lever arm, a flexible pivot to support the lever arm and to urge it resiliently against the movable member, adjustable stop means to limit the travel of the lever, and a pair of opposed pneumatic orifices between which the free end of the lever moves to effect differential valve action.

References Cited in the file of this patent
UNITED STATES PATENTS

| 2,727,705 | Rasmussen | Dec. 20, 1955 |
| 2,833,899 | Lones | May 6, 1958 |
| 2,873,754 | Dunaway | Feb. 17, 1959 |

FOREIGN PATENTS

| 681,626 | Germany | July 24, 1935 |